United States Patent
Li et al.

(10) Patent No.: US 11,310,843 B2
(45) Date of Patent: Apr. 19, 2022

(54) PDU SESSION ESTABLISHMENT METHOD AND APPARATUS

(71) Applicant: HUAWEI TECHNOLOGIES CO., LTD., Shenzhen (CN)

(72) Inventors: Xiaojuan Li, Beijing (CN); Haorui Yang, Shenzhen (CN); Hui Jin, Beijing (CN); Guowei Ouyang, Beijing (CN); Fenghui Dou, Beijing (CN); Xiaoyan Duan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/977,307

(22) PCT Filed: Mar. 11, 2019

(86) PCT No.: PCT/CN2019/077674
§ 371 (c)(1),
(2) Date: Sep. 1, 2020

(87) PCT Pub. No.: WO2019/174545
PCT Pub. Date: Sep. 19, 2019

(65) Prior Publication Data
US 2021/0007157 A1    Jan. 7, 2021

(30) Foreign Application Priority Data
Mar. 13, 2018   (CN) .......................... 201810205683.2

(51) Int. Cl.
*H04L 12/927*   (2013.01)
*H04W 36/00*   (2009.01)
(Continued)

(52) U.S. Cl.
CPC .......... *H04W 76/10* (2018.02); *H04L 47/803* (2013.01); *H04W 36/0066* (2013.01); *H04W 60/005* (2013.01); *H04W 88/06* (2013.01)

(58) Field of Classification Search
CPC ............. H04W 76/10; H04W 36/0066; H04W 60/005; H04W 88/06; H04W 76/12; H04W 84/12; H04L 47/803
See application file for complete search history.

(56) References Cited

U.S. PATENT DOCUMENTS

2012/0102174 A1*   4/2012   Zhou ...................... H04L 67/14
                                                    709/223
2015/0373617 A1   12/2015   Cho et al.
(Continued)

FOREIGN PATENT DOCUMENTS

CN   102655665 A   9/2012
CN   106105298 A   11/2016
(Continued)

OTHER PUBLICATIONS

LG Electronics, Session handling for without N26 interworking. 3GPP TSG-SA WG2 Meeting #126, Montreal, Canada, Feb. 26 Mar. 2, 2018, S2-181811, 14 pages.
(Continued)

*Primary Examiner* — Joseph E Dean, Jr.
(74) *Attorney, Agent, or Firm* — Rimon PC (57) ABSTRACT

This application discloses a PDU session establishment method and apparatus. The method includes: receiving, by a terminal device in a process of establishing a PDN connection in a first system, an access type that is sent by a core network device and that corresponds to the PDN connection in a second system; and when the terminal device moves to the second system, establishing, by the terminal device, a PDU session in the second system via an access network indicated by the access type, where the PDU session is
(Continued)

associated with the PDN connection. Implementation of the present invention can increase a success rate of establishing a PDU session.

11 Claims, 5 Drawing Sheets

(51) Int. Cl.
    *H04W 60/00*     (2009.01)
    *H04W 76/10*     (2018.01)
    *H04L 47/80*     (2022.01)
    *H04W 88/06*     (2009.01)

(56) References Cited

U.S. PATENT DOCUMENTS

| | | | |
|---|---|---|---|
| 2018/0014339 | A1 | 1/2018 | Baek et al. |
| 2019/0124561 | A1* | 4/2019 | Faccin .................. H04W 60/00 |
| 2021/0160186 | A1* | 5/2021 | Xu .......................... H04W 48/16 |
| 2021/0227438 | A1* | 7/2021 | Xu .......................... H04W 4/02 |

FOREIGN PATENT DOCUMENTS

| | | |
|---|---|---|
| CN | 107347205 B | 8/2019 |
| EP | 3737157 A1 | 11/2020 |
| WO | 2018006017 A1 | 1/2018 |

OTHER PUBLICATIONS

Huawei, HiSilicon, Additional PDU Session Type in Route Selection Descriptor. 3GPP TSG-SA WG2 Meeting #125, Gothenburg, Sweden, Jan. 22-26, 2018, S2-180967, 11 pages.

Nokia, Nokia Shanghai Bell, Pseudo-CR on EPS to 5GS Idle mode mobility using N26 interface. 3GPP TSG CT4 Meeting #83, Montreal, Canada; Feb. 26 Mar. 2, 2018, C4-182020, 17 pages.

3GPP TS 23.502 V2.0.0 (Dec. 1, 2017),3rd Generation Partnership Project;Technical Specification Group Services and System Aspects;Procedures for the 5G System;Stage 2(Release 15),total 259 pages.

C1-181736 Huawei et al.,"Adding access type in notification message",3GPP TSG-CT WG1 Meeting #109,Montreal (Canada), Feb. 26, 2018,total 7 pages.

S2-165682 Huawei,"Solution evaluation and selection for UE simultaneously connected to 3GPP and N3GPP (sol 4.20 and 4.24)",SA WG2 Meeting #117,17 Oct. 21, 2016, Kaohsiung,total 13 pages.

C1-181263 Huawei, HiSilicon,"Clean up to TS 24.501",3GPP TSG-CT WG1 Meeting #109,Montreal (Canada), Feb. 26, 2018,total 20 pages.

S2-174664 ZTE, Samsung,"23.501 P-CR: Trigger a UE via non-3GPP access for re-activating PDU sessions in 3GPP access",SA WG2 Meeting #122, Jun. 3, 2017, San Jose Del Cabo, Mexico,total 5 pages.

* cited by examiner

PDU SESSION ESTABLISHMENT METHOD AND APPARATUS

This application is a national stage of International Application No. PCT/CN2019/077674, filed on Mar. 11, 2019, which claims priority to Chinese Patent Application No. 201810205683.2, filed on Mar. 13, 2018. Both of the aforementioned applications are hereby incorporated by reference in their entireties.

TECHNICAL FIELD

The present invention relates to the communications field, and in particular, to a protocol data unit (PDU) session establishment method and apparatus.

BACKGROUND

A 5G (5th generation mobile communication) core network supports two different access types: 3GPP (3rd Generation Partnership Project) access and non-3GPP access. When UE (user equipment) is switched from a packet data network (PDN) connection established in an EPS (evolved packet system) to a PDU (protocol data unit) session of a 5GS (5th Generation mobile communication system, 5th generation mobile communication system), the UE first registers with a 5GC (5th generation core network) via an access network, and then establishes a PDU session in a 5GC via the access network after registration succeeds.

Currently, a solution for switching UE from an EPS to a 5GS includes: The UE accesses a 5GC in a 3GPP manner by default. When the UE moves to a non-3GPP access network of a 5GS, the UE does not initiate a registration procedure or a PDU session establishment procedure via the non-3GPP access network even if the PDN connection supports access in a non-3GPP manner. However, the UE performs the registration procedure and the PDU session establishment procedure after moving to a 3GPP access network of a 5GS. This increases latency for the UE to access the 5GS.

SUMMARY

To resolve the technical problem, embodiments of the present invention provide a PDU session establishment method and apparatus. When a PDN connection established in an EPS is switched to a PDU session in a 5GS, access is performed based on an access type supported by the PDN connection, to reduce an access failure probability.

According to a first aspect, this application provides a PDU session establishment method, including: receiving, by a terminal device in a process of establishing a PDN connection in a first system, an access type that is sent by a core network device, where the PDN connection is established in a core network of the first system; and establishing, by the terminal device, a PDU session associated with the PDN connection in a second system via an access network indicated by the access type.

The first system and the second system each include two parts: an access network and a core network. This application relates to a scenario in which the PDN connection established in the core network of the first system is switched to the PDU session in the core network of the second system. An access type of the PDN connection indicates a type of an access network supported during registration and PDU session establishment. When the terminal device moves from the access network of the first system to the access network of the second system, the terminal device needs to determine whether a type of the access network of the second system matches an access type carried in a PCO message. If the type of the access network of the second system matches the access type carried in the PCO message, the terminal device can register with and establish the PDU session in the core network of the second system via a current access network.

In a possible design, the core network device includes a PGW-C(PDN gateway-control)+an SMF.(session management function)

In a possible design, the first system includes an EPS, and the second system includes a 5GS.

In a possible design, the access type includes 3GPP access and non-3GPP access.

In a possible design, the registering, by the terminal device, with the core network of the second system and establishing a PDU session associated with the PDN connection via an access network indicated by the access type includes:

registering, by the terminal device, with a core network of a 5GS via a 3GPP access network, and after registration succeeds, establishing, by the terminal device in the core network of the 5GS via the 3GPP access network, the PDU session associated with the PDN connection;

registering, by the terminal device, with a core network of a 5GS via a non-3GPP access network, and after registration succeeds, establishing, by the terminal device, the PDU session in the core network of the 5GS via the non-3GPP access network; or registering, by the terminal device, with a core network of a 5GS via a 3GPP access network and a non-3GPP access network, and after registration succeeds, establishing, by the terminal device, the PDU session in the core network of the 5GS via the 3GPP access network and the non-3GPP access network.

In a possible design, after successfully establishing the PDU session, the terminal device obtains a URSP (UE route selection policy) rule of an application and a parameter of the PDU session. If the parameter of the PDU session matches the URSP rule of the application, the terminal device binds the application to the PDU session.

Alternatively, if the parameter of the PDU session does not match the URSP rule of the application, the terminal device skips binding the application to the PDU session, or releases the PDU session.

In implementation of this embodiment of the present invention, when the terminal device needs to be switched from the PDN connection of the first system to the PDU session of the second system, the terminal device performs registration and PDU session establishment based on the access type supported by the to-be-switched PDU session, to avoid a case in which when the terminal device does not know the access type of the PDU session, the terminal device does not perform registration and PDU session establishment when the terminal device is switched to an access network supported by a PDU session, to reduce a PDU session establishment latency, or avoid a case in which when the terminal device does not know the access type of the PDU session, for the PDU session is established in the 5GS, switching cannot be performed between the 3GPP access and the non-3GPP access.

According to a second aspect, this application provides a PDU session establishment apparatus, including:

a receiving unit, configured to receive: in a process of establishing a PDN connection in a first system, an access type that is sent by a core network device and that corresponds to the PDN connection in a second system; and a processing unit, configured to: when the terminal device moves to the second system, establish a PDU session in the second system via an access network indicated by the access type, where the PDU session is associated with the PDN connection.

In a possible design, that a processing unit is configured to receive, in a process of establishing a PDN connection in a first system, an access type that is sent by a core network device and that corresponds to the PDN connection in a second system includes:

receiving a protocol configuration option PCO sent by the core network device, where the PCO carries the access type supported by the PDN connection in the second system.

In a possible design, the core network device includes a PGW-C+an SMF.

In a possible design, the access type includes 3GPP access and non-3GPP access.

In a possible design, the processing unit is further configured to:

register with the second system via the access network indicated by the access type.

In a possible design, that the processing unit registers with the second system via the access network indicated by the access type includes: registering with the second system via a 3GPP access network;

registering with the second system via a non-3GPP access network; or registering with the second system via both a 3GPP access network and a non-3GPP access network.

In a possible design, the processing unit is further configured to:

determine to use a terminal device route selection policy (URSP) rule corresponding to an application of the PDU session; and when a parameter of the PDU session does not match the URSP rule of the application, skip binding the application to the PDU session or release the PDU session.

Another aspect of this application provides an apparatus. The apparatus has functions of implementing behaviors of the terminal device in the possible implementation methods of the first aspect. The function may be implemented by hardware, or may be implemented by hardware executing corresponding software. The hardware or the software includes one or more units corresponding to the foregoing functions.

Another aspect of this application provides an apparatus. The apparatus includes a memory and a processor. The memory stores a group of program code, and the processor is configured to invoke the program code stored in the memory, to perform the first aspect and the possible implementations of the first aspect.

Another aspect of this application provides a computer-readable storage medium. The computer-readable storage medium stores an instruction, and when the instruction is run on a computer, the computer is enabled to perform the method according to the foregoing aspects.

Another aspect of this application provides a computer program product including an instruction, and when the computer program product runs on a computer, the computer is enabled to perform the method according to the foregoing aspects.

BRIEF DESCRIPTION OF DRAWINGS

To describe technical solutions in embodiments of the present invention or in the background more clearly, the following briefly describes accompanying drawings required for describing the embodiments of the present invention or the background.

DESCRIPTION OF EMBODIMENTS

Figure 1:
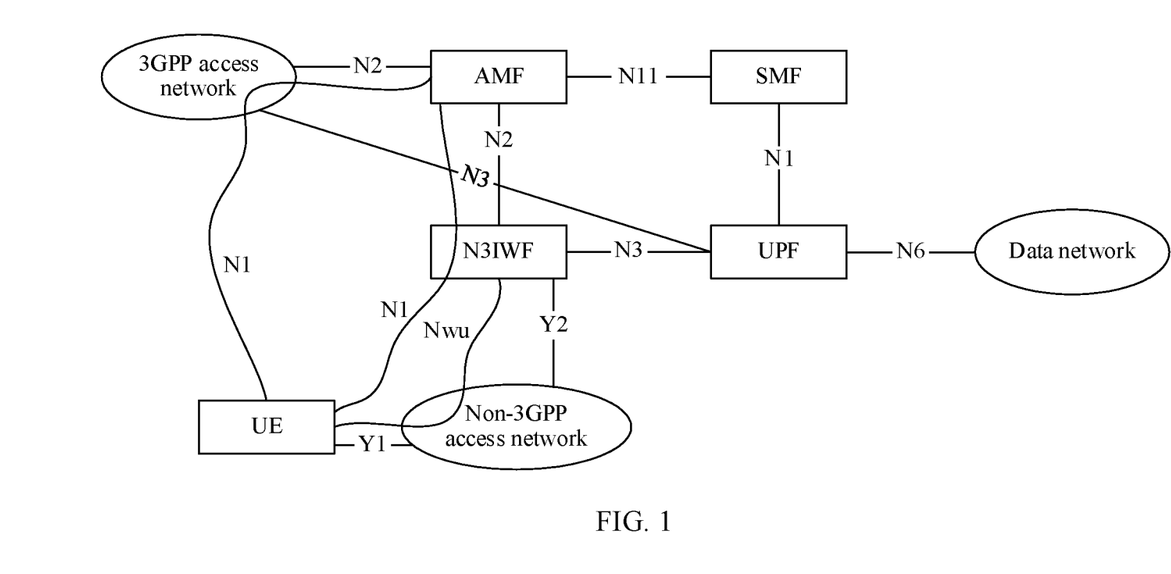
FIG. 1 is a network architecture diagram of a communications system according to an embodiment of the present disclosure.

FIG. 1 is a schematic architectural diagram of a 5GS according to this application. The 5GS includes UE, a 3GPP access network, a non-3GPP access network, an AMF (access and mobility management function entity), an SMF (session management function entity), an N3IWF, a UPF (user plane function entity), and a data network (DN). The 3GPP access network and the non-3GPP access network belong to a 5GS access network, and the AMF, the SMF, the N3IWF, and the UPF belong to a 5G core network. The AMF is mainly configured to perform authentication and authorization on a user, and perform mobility management on the user. The SMF is mainly configured to manage a PDU session, manage a QoS flow used for data in the 5GS, and allocate an IP address to the UE. The UPF is mainly an interface gateway between an operator network and an external network. For an interface type of each network element in the 5GS, refer to FIG. 1. Details are not described herein.

The 3GPP access network and the non-3GPP access network each include a plurality of access network devices, and the access network device provides a service for UE in a coverage area. For example, the access network device provides radio access for one or more UEs in a coverage area. In addition, the access network devices may further communicate with each other. 3GPP access indicates an access mode that complies with a 3GPP standard. For example, the 3GPP access includes GERAN (GSM/EDGE radio access network), UTRAN (UMTS terrestrial radio access network), E-UTRAN (evolved UMTS terrestrial radio access network), NR-RAN (new radio radio access network), and the like. Non-3GPP access indicates an access mode that does not comply with the 3GPP standard, for example, a WiFi (wireless fidelity) access network, a wired access network, or a CDMA (code division multiple access) access network.

The access network device may be a device configured to communicate with the UE. For example, the access network device may be a base transceiver station (BTS) in a GSM system or CDMA system, or may be a NodeB (NB) in a WCDMA system, or may be an evolved NodeB (eNB or eNodeB) in an LTE system or a network side device in a future 5G network. Alternatively, the network device may be a relay station, an access point, a vehicle-mounted device, or the like. In a terminal device-to-terminal device (D2D)

communications system, the network device may alternatively be a terminal device acting as a base station. The terminal device may include a handheld device, a vehicle-mounted device, a wearable device, or a computing device that provides a wireless communication function; another processing device connected to a wireless modem, user equipment (UE) in various forms, a mobile station (mobile station, MS), or the like.

In the embodiments of this application, the UE includes but is not limited to a mobile station (MS), a mobile terminal device, a mobile telephone, a handset, a portable equipment, and the like. The terminal device may communicate with one or more core networks via a radio access network (RAN). For example, the terminal device may be a mobile telephone (or referred to as a "cellular" telephone) or a computer having a wireless communication function. The terminal device may alternatively be a portable, pocket-sized, handheld, computer built-in, or in-vehicle mobile apparatus or device.

Figure 2:
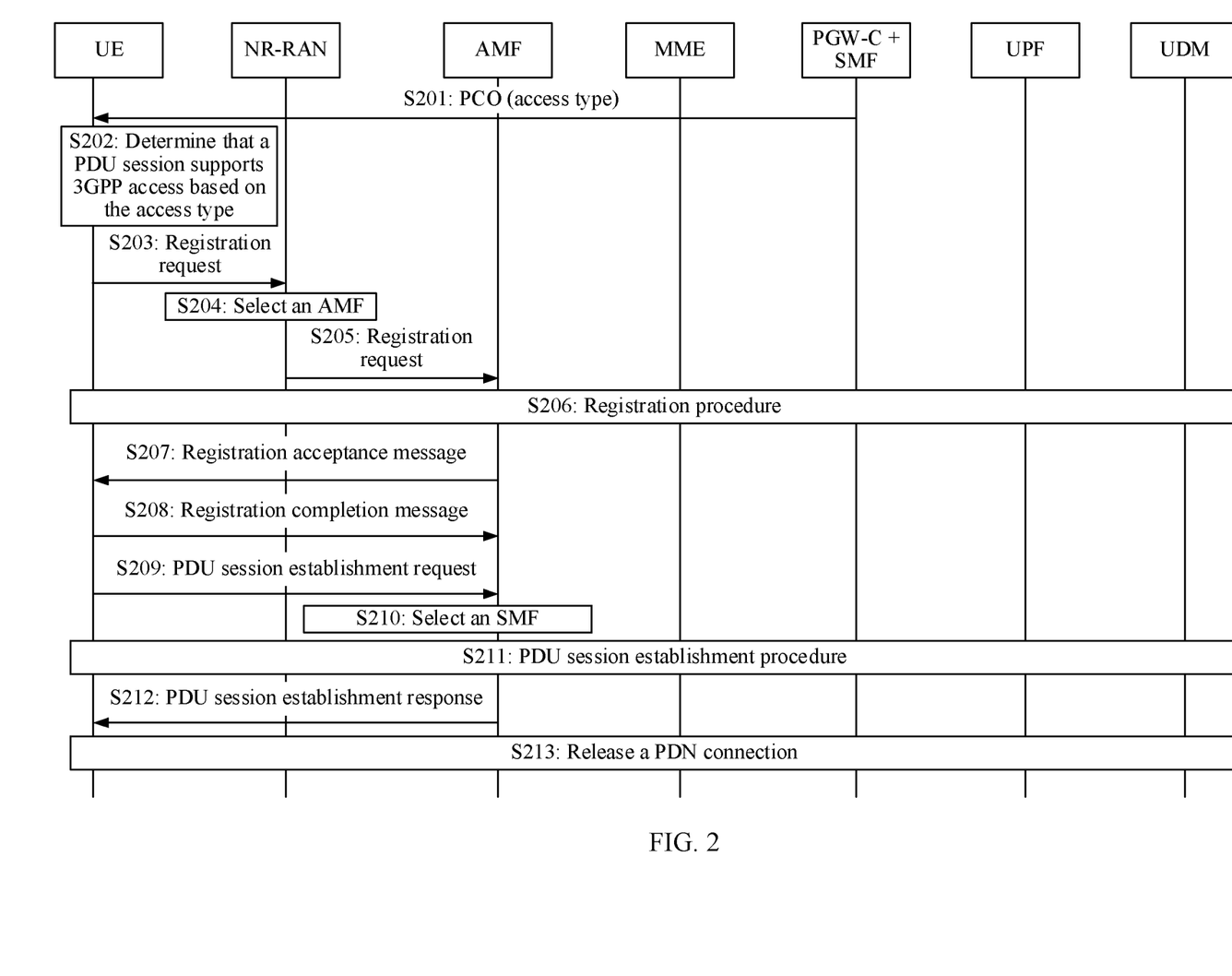
FIG. 2 is a schematic interaction diagram of a PDU session establishment method according to an embodiment of the present disclosure.

FIG. 2 is a schematic interaction diagram of a PDU session establishment method according to an embodiment of the present invention. In this embodiment of the present invention, the method includes the following steps.

S201: An SMF+a PGW-C sends a PCO to a terminal device, and the terminal device receives the PCO from the SMF+the PGW-C.

A scenario in this embodiment of the present invention includes that the terminal device is switched from a PDN (public data network) connection in an EPS to a PDU (protocol data unit) session in a 5GS. Before the terminal device is switched from the EPS to the 5GS, the terminal device may attach to a core network of the EPS via 3GPP access or non-3GPP access. The core network of the EPS may also be referred to as an EPC (evolved packet core). The terminal device establishes one or more PDN connections in the EPC, and the one or more PDN connections may correspond to one or more EPS bearers.

The PGW-C+the SMF includes the PGW-C(PDN gateway-control) and the SMF. The SMF is located in a core network of the 5GS, and the core network of the 5GS is also referred to as a 5GC. A PGW is located in the EPC, and the SMF and the PGW-C may be combined and disposed in one physical server. The PGW-C is a border gateway of the EPC, mainly provides functions such as session management and bearer management of a user session, data forwarding, IP address allocation, and non-3GPP user access, and is an anchor point for the 3GPP access and the non-3GPP access to a PDN. The SMF is mainly configured to manage a PDU session, manage a QoS flow used for data in the 5GC, and allocate an IP address to the terminal device.

In a process of establishing the PDN connection in the EPC, the PGW-C+the SMF sends, to the terminal device by using the PCO, an access mode (access type) supported by the PDN connection in the 5GS. The terminal device may establish a corresponding PDU session in the 5GC based on the access type. For example, the access type includes at least one of the 3GPP access and the non-3GPP access. The 3GPP access indicates an access mode that complies with a 3GPP standard. For example, the 3GPP access includes GERAN access, UTRAN (UMTS terrestrial radio access network) access, E-UTRAN (evolved UMTS terrestrial radio access network), NR-RAN (new radio radio access network) access, and the like. The non-3GPP access indicates an access mode that does not comply with the 3GPP standard, for example, WiFi access, wired access, or CDMA (code division multiple access) access.

In this embodiment of the present invention, the PCO carries the access type supported by the PDN connection in a second system. The access type indicates a type of an access network supported during registration and establishment of a PDU session associated with the PDN connection, and the type of the access network includes a 3GPP access network and a non-3GPP access network. Access performed in the 3GPP access network is the foregoing 3GPP access mode, and access performed in the non-3GPP access network is the foregoing non-3GPP access mode.

S202: The terminal device determines, based on the access type, that access to the 5G core network via a current access network is supported.

When moving from an access network of the EPS to an access network of the 5GS, the terminal device determines whether a type of the 5GS access network on which the terminal device currently camps meets a requirement of the access type in S201. If the type of the access network of the 5GS on which the terminal device currently camps meets the requirement of the access type in S201, the terminal device determines that access to the 5G core network via the current access network is supported. If the type of the access network of the 5GS on which the terminal device currently camps does not meet the requirement of the access type in S201, the terminal device determines that access to the 5G core network via the current access network is not supported.

For example, the access type includes the 3GPP access and the non-3GPP access. The access network of the 5GS on which the terminal device currently camps is an NR-RAN, and the terminal device determines that access to the 5G core network via a current NR-RAN is supported. Alternatively, when the access network of the 5GS on which the terminal device currently camps is a WiFi network, the terminal device determines that access to the 5G core network via a current WiFi network is supported.

For another example, the access type includes the 3GPP access. When the access network of the 5G system on which the terminal device currently camps is a WiFi network, the terminal device determines that access to the 5G core network via the WiFi network is not supported.

S203: The terminal device sends a registration request to the NR-RAN, and the NR-RAN receives the registration request from the terminal device.

Assuming that the access network on which the terminal device currently camps is the NR-RAN, the terminal device sends the registration request to the NR-RAN, where the registration request is used to register with the 5GC. The registration request is a NAS (non-access stratum) message, and the registration request includes at least one of a registration type, a SUPI (Subscription Permanent Identifier), a 5G-GUTI (globally unique temporary terminal device identity), a TAI (tracking area identity) accessed last time, a security parameter, requested NSSAI (network slice selection assistance information), mapping of req terminal device sted NSSAI, a terminal device 5GC capacity, and a PDU session status. When the terminal device in this embodiment moves from the access network of the EPS to the access network of the 5GS, a request type in the registration request may be "mobility registration update".

S204: The NR-RAN selects an AMF.

If the registration request includes the SUPI or the 5G-GUTI and does not indicate a valid AMF, the NR-RAN may select an AMF based on an access technology and the requested NSSAI. If the terminal device is in a connection status, the NR-RAN can forward the registration request to the selected AMF through an N2 interface. If the NR-RAN cannot select a proper AMF, the NR-RAN may send the registration request to a pre-configured AMF, and the AMF selects a new AMF.

S205: The NR-RAN sends the registration request to the AMF, and the AMF receives the registration request from the NR-RAN.

The NR-RAN sends the registration request to the AMF through the N2 interface, and a parameter carried in the registration request is the same as a parameter carried in the registration request in S204, for example, the registration request carries at least one of the registration type, the SUPI, the 5G-GUTI, the TAI accessed last time, the security parameter, and the requested NSSAI.

Optionally, the registration request further includes a selected PLMN ID, location information, a cell identity, and a related radio access technology type of a cell in which the terminal device is roaming. When a radio access network is the NR-RAN, an N2 parameter also includes an establishment cause.

Optionally, if the registration type is "mobility registration update," and when the terminal device instructs to move the terminal device from the EPS to the 5GS and the AMF is configured to support interworking from the 5GS to the ESP when there is no N26 interface, the AMF considers this registration request as "initial registration" and the AMF omits a PDU session status synchronization process.

S206: Perform a registration procedure.

The registration procedure in this embodiment of the present invention relates to that the terminal device registers with the 5GC after being switched from the EPS to the 5GS, so that the terminal device has permission to use a related service provided by the 5GC.

S207: The AMF sends registration acceptance to the terminal device, and the terminal device receives the registration acceptance from the AMF.

S208: The terminal device sends registration completion to the AMF, and the AMF receives the registration completion from the terminal device.

S209: The terminal device sends a PDU session establishment request to the AMF, and the AMF receives the PDU session establishment request from the terminal device.

A PDU session establishment procedure in this embodiment includes: switching, by the terminal device, from the EPS to the 5GS, and switching, by the terminal device, the PDN connection established in the EPS to the 5GS to establish the corresponding PDU session. After the terminal device successfully registers with the 5GC, an application on the terminal device triggers a PDU session establishment process when data needs to be transmitted. The terminal device determines, based on the access type obtained in S201, whether establishment of the PDU session via the access network on which the terminal device currently camps is supported. If a determining result is yes, the terminal device sends the PDU session establishment request to the AMF via the access network on which the terminal device currently camps. The PDU session establishment request is a NAS (non-access stratum) message, and the PDU session establishment request carries at least one of one or more pieces of S-NSSAI, a DNN, a PDU session ID, a request type, and a PDN connection ID. Because the scenario in this embodiment of the present invention is that the PDN connection established in the EPS is switched to the PDU session in the 5GS, the request type is an "existing PDU session".

S210: The AMF selects an SMF.

If the request type indication is the "existing PDU session", the AMF selects the SMF based on an SMF-ID (SMF identity) from UDM (unified data management).

S211: Perform a PDU session establishment process.

For the PDU session establishment process, refer to an existing PDU session establishment process in the 5GC. Details are not described herein. If the PDN connection established by the terminal device in the EPC needs to be transferred to the 5GC to maintain a same IP address or prefix, the request type in the PDU session establishment procedure requested by the terminal device is the "existing PDU session", and the terminal device provides the DNN and the PDU session ID.

S212: The AMF sends a PDU session establishment response to the terminal device.

The PDU session establishment response is used to notify that the PDU session is successfully established in the 5GC.

S213: Release the PDN connection.

After the PDU session is successfully established in the 5GC, the PGW-C+the SMF releases a resource of the PDN connection in the EPC. For example, the PGW-C starts a bearer deactivation process to release an EPS bearer associated with the PDN connection.

Optionally, establishment of the PDU session may be triggered by the application on the terminal. The terminal device obtains a URSP rule of the application, and after the PDU session is successfully established, determines whether a parameter of the PDU session matches the URSP rule of the application. If the parameter of the PDU session matches the URSP rule of the application, the terminal device binds the application to the PDU session. If the parameter of the PDU session does not match the URSP rule of the application, the terminal device skips binding the PDU session to the application, or the terminal device performs a process of releasing the PDU session, to release a resource occupied by the PDU session in the 5G system.

That the terminal device obtains a URSP rule of the application includes: determining, by the terminal device, the URSP rule of the application from a PCF (policy control function), and storing the URSP rule. The PDU session is associated with the application on the terminal device, to trigger the terminal device to obtain the URSP rule of the application. The URSP rule includes parameter values required by the application to establish the PDU session in the 5GS: SSC mode (session continuity mode), slice info (slice information), the DNN (data network name), and the access type. A quantity of the foregoing parameter values may be one or more. If there are a plurality of values, the values are filtered based on priorities. For example, a URSP rule of an APP 1 is {3GPP access; DNN1; S-NSSAI A, S-NSSAI B; SSC Mode 1}. A URSP rule of an APP 2 is {non 3GPP access, 3GPP access; DNN2; S-NSSAI C, S-NSSAI D}. Assuming that the APP 1 is associated with the PDU session, the URSP rule of the APP 1 is obtained after association. In addition, assuming that there is no signal in the 5GS in the 3GPP access in a current area, the terminal device registers with the 5GS via the non-3GPP access. By comparing the URSP rule of the APP 1, it is learned that an access type of the application can only be the 3GPP access. Therefore, the terminal device determines that a current APP 1 does not match a current PDU session, and the terminal device skips binding the APP 1 to the PDU session, and performs the process of releasing the PDU session.

According to the description in FIG. 2, when the terminal device needs to be switched from the EPS to the 5GS, the terminal device registers with the 5G core network and establishes the PDU session in the 5G core network based on the access type supported by the PDU session via a specified access network. This avoids a case in which the terminal device is rejected when performing registration and PDU session establishment via an unsupported access network, and improves an access probability. In addition, this avoids a case in which the terminal device does not perform registration and PDU session when camping on a supported access network, and reduces access latency of the terminal device.

Figure 3:
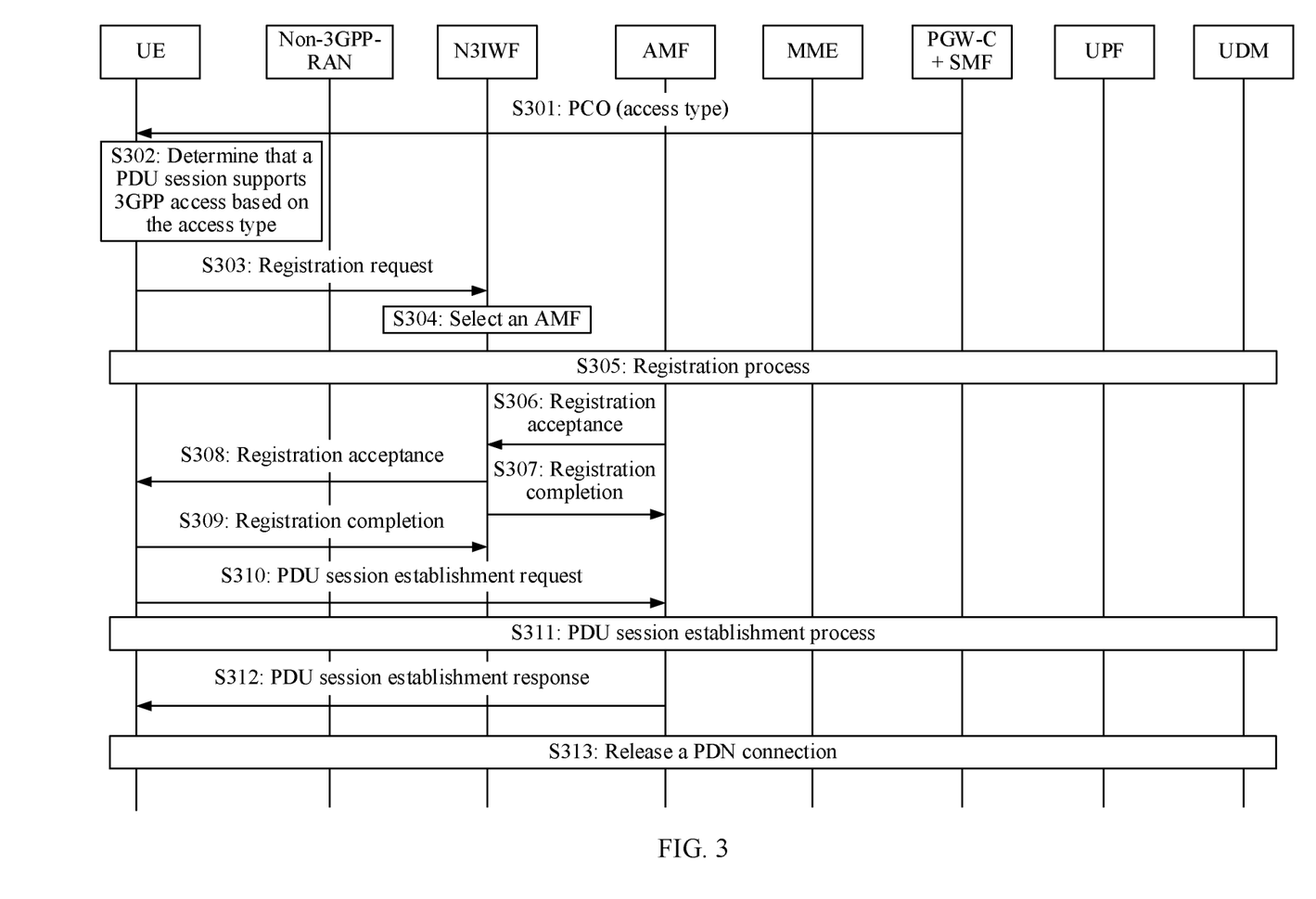
FIG. 3 is another schematic interaction diagram of a PDU session establishment method according to an embodiment of the present disclosure.

FIG. 3 is a schematic interaction diagram of a PDU session establishment method according to an embodiment of the present invention. In this embodiment of the present invention, the method includes the following steps.

S301: A PGW-C+an SMF sends a PCO to a terminal device, and the terminal device receives the PCO from the PGW-C+the SMF.

Specifically, a scenario in this embodiment of the present invention includes that the terminal device is switched from an EPS to a 5GS, the terminal device establishes a PDN connection in the EPS, and the terminal device needs to be switched from the PDN connection in the EPS to a PDU session in the 5GS. The terminal device may attach to an EPC in a 3GPP manner or a non-3GPP manner. The terminal device establishes one or more PDN connections in the EPC, and the one or more PDN connections correspond to one or more EPS bearers.

The PGW-C+the SMF includes the PGW-C and the SMF. The SMF is located in a 5G core network, and the 5G core network is also referred to as a 5GC. A PGW is located in the EPC, and the SMF and the PGW-C may be combined and disposed in one physical server. The PGW-C is a border gateway of the EPC, mainly provides functions such as session management and bearer management of a user session, data forwarding, IP address allocation, and non-3GPP user access, and is an anchor point for 3GPP access and non-3GPP access to a PDN. The SMF is mainly configured to manage a PDU session, manage a QoS flow used for data in the 5GC, and allocate an IP address to the terminal device.

In a process of establishing the PDN connection in the EPS, the PGW-C+the SMF may send, to the terminal device by using the PCO, an access mode supported by the PDN connection in the 5GS.

S302: The terminal device determines that access to the 5GC via a current access network is supported.

Specifically, when moving from an access network of the EPS to an access network of the 5GS, the terminal device determines whether a type of the access network of the 5GS on which the terminal device currently camps meets a requirement of the access type in S301. If the type of the access network of the 5GS on which the terminal device currently camps meets the requirement of the access type in S301, the terminal device determines that access to the 5G core network via the access network on which the terminal device currently camps is supported. If the type of the access network of the 5GS on which the terminal device currently camps does not meet the requirement of the access type in S301, the terminal device determines that access to the 5GC via the access network on which the terminal device currently camps is not supported.

For example, the access type includes 3GPP access and non-3GPP access, the access network of the 5GS on which the terminal device currently camps is a non-3GPP access network, and the terminal device determines that access to the 5GC via a current non-3GPP access network is supported.

The non-3GPP access network is an untrusted access network, and the terminal device may connect to the non-3GPP access network in any non-3GPP authentication mode, for example, no authentication, EAP with pre-shared key or username/password. When the terminal device needs to attach to the 5G core network, the terminal device selects an N3IWF from a 5G PLMN.

S303: The terminal device sends a registration request to the N3IWF, and the N3IWF receives the registration request from the terminal device.

Specifically, the terminal device sends the registration request to the N3IWF via the non-3GPP access network.

S304: The N3IWF selects an AMF.

The N3IWF selects an AMF based on a received AN parameter and a received local policy. After selecting the AMF, the N3IWF forwards the NAS registration request to the selected AMF.

S305: Perform a registration procedure.

Specifically, the registration procedure in this embodiment of the present invention relates to that after the terminal device is switched from the EPS to the 5GS, the terminal device registers with the 5G core network, so that the terminal device has permission to use a related service provided by the 5G core network.

S306: The AMF sends a registration acceptance message to the N3IWF, and the N3IWF receives the registration acceptance message from the AMF.

Specifically, when the terminal device successfully registers with the 5GS, the AMF sends the registration acceptance to the N3IWF.

S307: The N3IWF sends a registration acceptance message to the terminal device, and the terminal device receives the registration acceptance message from the N3IWF.

S308: The terminal device sends a registration completion message to the N3IWF, and the N3IWF receives the registration completion message from the terminal device.

S309: The N3IWF sends a registration completion message to the AMF, and the AMF receives the registration completion message from the N3IWF.

S310: The terminal device sends a PDU session establishment request to the AMF, and the AMF receives the PDU session establishment request from the terminal device.

S311: Perform a PDU session establishment process.

After successfully registering with the 5G core network via the non-3GPP access network, the terminal device may trigger the PDU session establishment process when data needs to be transmitted. The terminal device determines, based on the access type obtained in S301, whether establishment of the PDU session via the non-3GPP access network on which the terminal device currently camps is supported. If a determining result is yes, the terminal device sends the PDU session establishment request to the AMF via the non-3GPP access network on which the terminal device currently camps and the N3IWF. The PDU session establishment request is a NAS message, and the PDU session establishment request carries at least one of one or more pieces of S-NSSAI, a DNN, a PDU session ID, a request type, and a PDN connection ID. Because the scenario in this embodiment of the present invention is that the PDN connection established in the EPS is switched to the PDU session in the 5GS, the request type is an "existing PDU session".

S312: The AMF sends a PDU session establishment response to the terminal device.

S313: Release the PDN connection.

After the terminal device successfully establishes the PDU session in the 5G core network, the PGW-C+the SMF releases a resource of the PDN connection in the EPC. For example, the PGW-C starts a bearer deactivation process to release an EPS bearer associated with the PDN connection.

Optionally, the established PDU session is associated with an application on the terminal device. The terminal device obtains a URSP rule of the application, and after the PDU session is successfully established, determines whether a parameter of the PDU session matches the URSP rule of the application. If the parameter of the PDU session matches the URSP rule of the application, the terminal device binds the application to the PDU session. If the parameter of the PDU session does not match the URSP rule of the application, the terminal device skips binding the PDU session to the application, or the terminal device performs a process of releasing the PDU session, to release a resource occupied by the PDU session in the 5G system.

That the terminal device obtains a URSP rule of the application includes: determining, by the terminal device, the URSP rule of the application from a PCF (Policy Control Function, policy control function), and storing the URSP rule. The PDU session is associated with the application on the terminal device, to trigger the terminal device to obtain the URSP rule of the application. The URSP rule includes parameter values required by the application to establish the PDU session in the 5GS: SSC mode (session continuity mode), slice info (slice information), the DNN (data network name), and the access type. A quantity of the foregoing parameter values may be one or more. If there are a plurality of values, the values are filtered based on priorities. For example, a URSP rule of an APP 1 is {3GPP access; DNN1; S-NSSAI A, S-NSSAI B; SSC Mode 11}. A URSP rule of an APP 2 is {non 3GPP access, 3GPP access; DNN2; S-NSSAI C, S-NSSAI D}. Assuming that the APP 1 is associated with the PDU session, the URSP rule of the APP 1 is obtained after association. In addition, assuming that there is no signal in the 5GS in the 3GPP access in a current area, the terminal device registers with the 5GS via the non-3GPP access. By comparing the URSP rule of the APP 1, it is learned that an access type of the application can only be the 3GPP access. Therefore, the terminal device determines that a current APP 1 does not match a current PDU session, and the terminal device skips binding the APP 1 to the PDU session, and performs the process of releasing the PDU session.

According to the description in FIG. 3, when the terminal device needs to be switched from the EPS to the 5GS, the terminal device registers with the 5G core network and establishes the PDU session in the 5G core network based on the access type supported by the PDU session via a specified access network. This avoids a case in which the terminal device is rejected when performing registration and PDU session establishment via an unsupported access network, and improves an access probability. In addition, this avoids a case in which the terminal device does not perform registration and PDU session when camping on a supported access network, and reduces an access latency of the terminal device.

The embodiments in FIG. 2 and FIG. 3 describe in detail the PDU session establishment methods in the embodiments of the present invention. An apparatus 4 shown in FIG. 4 may implement the terminal device in the embodiment shown in FIG. 2 or FIG. 3. The apparatus 4 includes a receiving unit 401 and a processing unit 402.

Figure 4:
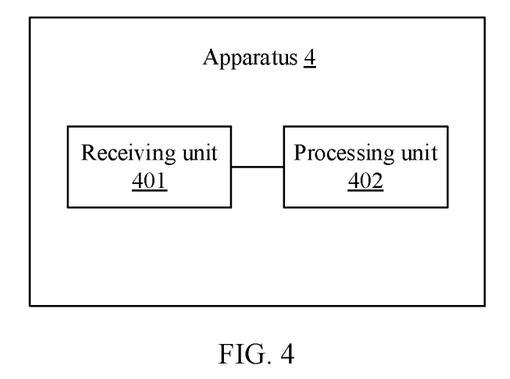
FIG. 4 is a schematic structural diagram of an apparatus according to an embodiment of the present disclosure.

The receiving unit 401 is configured to receive: in a process of establishing a PDN connection in a first system, an access type that is sent by a core network device and that corresponds to the PDN connection in a second system.

The processing unit 402 is configured to: when the terminal device moves to the second system, establish a PDU session in the second system via an access network indicated by the access type, where the PDU session is associated with the PDN connection.

Optionally, that the processing unit 402 is configured to receive, in a process of establishing a PDN connection in a first system, an access type that is sent by a core network device and that corresponds to the PDN connection in a second system includes:

receiving a protocol configuration option PCO sent by the core network device, where the PCO carries the access type supported by the PDN connection in the second system.

Optionally, the core network device includes a PGW-C+ an SMF.

Optionally, the access type includes 3GPP access and non-3GPP access.

Optionally, the processing unit 402 is further configured to:

register with the second system via the access network indicated by the access type.

Optionally, that the processing unit 402 is configured to register with the second system via the access network indicated by the access type includes:

registering with the second system via a 3GPP access network;

registering with the second system via a non-3GPP access network; or registering with the second system via both a 3GPP access network and a non-3GPP access network.

Optionally, the processing unit 402 is further configured to:

determine to use a terminal device route selection policy (URSP) rule corresponding to an application of the PDU session; and when a parameter of the PDU session does not match the URSP rule of the application, skip binding the application to the PDU session or release the PDU session.

The apparatus 4 may be a terminal device, or the terminal device may be a field programmable gate array (FPGA), a special-purpose integrated chip, a system on chip (SoC), a central processing unit (CPU), a network processor (NP), a digital signal processing circuit, or a micro controller (micro controller unit (MCU)) that implements a related function, or may be a programmable controller (programmable logic device (PLD)) or another integrated chip.

This embodiment of the present invention and the method embodiments in FIG. 2 and FIG. 3 are based on a same concept, technical effects brought by the embodiments are also the same. For a specific process, refer to the descriptions in the method embodiments in FIG. 2 and FIG. 3. Details are not described herein.

Figure 5:
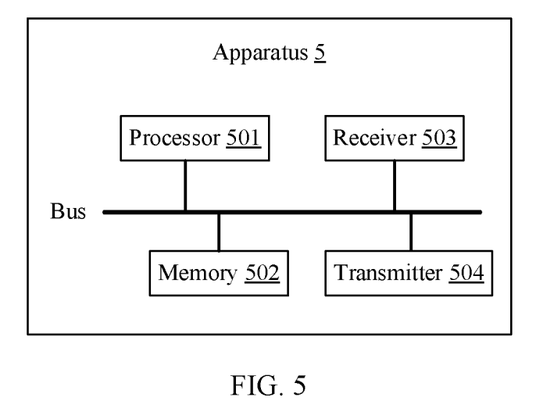
FIG. 5 is another schematic structural diagram of an apparatus according to an embodiment of the present disclosure.

FIG. 5 is a schematic structural diagram of an apparatus according to an embodiment of the present invention. The apparatus is briefly referred to as an apparatus 5 below. The apparatus 5 may be integrated into the foregoing terminal device. As shown in FIG. 5, the apparatus includes a memory 502, a processor 501, a transmitter 504, and a receiver 503.

The memory 502 may be an independent physical unit, and may be connected to the processor 501, the transmitter 504, and the receiver 503 via a bus. Alternatively, the memory 502, the processor 501, the transmitter 504, and the receiver 503 may be integrated together and implemented by hardware, or the like.

The transmitter 504 and the receiver 503 may be further connected to an antenna. The receiver 503 receives, by using the antenna, information sent by another device. Correspondingly, the transmitter 504 transmits information to another device by using the antenna.

The memory 502 is configured to store a program for implementing the foregoing method embodiments or each module in the apparatus embodiment, and the processor 501 invokes the program to perform the operations of the foregoing method embodiments.

Optionally, when some or all of the PDU session establishment methods in the foregoing embodiments are implemented by using software, a random access apparatus may alternatively include only a processor. A memory configured to store a program is located outside the random access apparatus, and the processor is connected to the memory by using a circuit/wire and configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random-access memory (RAM). The memory may alternatively include a non-volatile memory, for example, a flash memory, a hard disk (HDD), or a solid-state drive (SSD). The memory may alternatively include a combination of the foregoing types of memories.

In the foregoing embodiments, the sending module or the transmitter performs the steps of sending in the foregoing method embodiments, the receiving module or the receiver performs the steps of reception in the foregoing method embodiments, and other steps are performed by another module or the processor. The sending module and the receiving module may constitute a transceiver module, and the receiver and the transmitter may constitute a transceiver.

An embodiment of this application further provides a computer storage medium storing a computer program, and the computer program is used to perform the PDU session establishment methods provided in the foregoing embodiments.

An embodiment of this application further provides a computer program product including an instruction. When the computer program product runs on a computer, the computer is enabled to perform the PDU session establishment methods in the foregoing embodiments.

Figure 6:
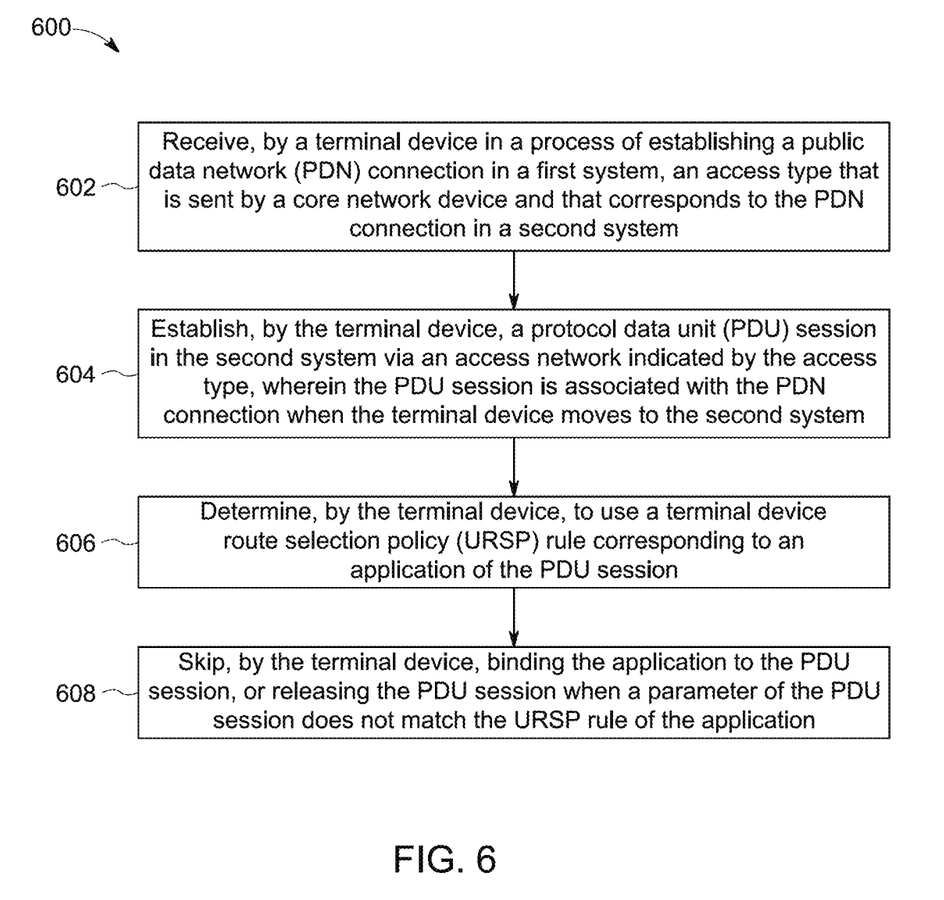
FIG. 6 is a flow chart of a PDF session establishment method according to an embodiment of the present disclosure.

FIG. 6 describes a flowchart 600 of an exemplary embodiment of a PDU session establishment method. In FIG. 6, a terminal device that is in the process of establishing a public data network (PDN) connection in a first system receives an access type that is sent by a core network device (step 602). The access type corresponds to the PDN connection in a second system. The terminal device establishes a protocol data unit (PDU) session in the second system via an access network indicated by the access type (step 604). The PDU session is associated with the PDN connection when the terminal device moves to the second system. The terminal also determines a user equipment route selection policy (URSP) rule according to the application of the PDU sessions (step 606) and skips binding the application to the PDU session (step 608). Alternatively, the terminal device may release the PDU session when a parameter of the PDU session does not match the URSP rule of the application (step 608).

A person skilled in the art should understand that the embodiments of this application may be provided as a method, a system, or a computer program product. Therefore, this application may use a form of hardware only embodiments, software only embodiments, or embodiments with a combination of software and hardware.

Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or another programmable device, to generate computer-implemented processing. Therefore, the instructions executed on the computer or another programmable device provide steps for implementing a specific function in one or more processes in the flowcharts and/or in one or more blocks in the block diagrams.

What is claimed is:

1. A PDU session establishment method, comprising:
   receiving, by a terminal device in a process of establishing a public data network (PDN) connection in a first system, an access type that is sent by a core network device and that corresponds to the PDN connection in a second system;
   when the terminal device moves to the second system, establishing, by the terminal device, a protocol data unit (PDU) session in the second system via an access network indicated by the access type, wherein the PDU session is associated with the PDN connection;
   determining, by the terminal device, to use a terminal device route selection policy (URSP) rule corresponding to an application of the PDU session; and
   when a parameter of the PDU session does not match the URSP rule of the application, skipping, by the terminal device, binding the application to the PDU session, or releasing the PDU session.

2. The method according to claim 1, wherein the receiving, by a terminal device in a process of establishing a PDN connection in a first system, an access type that is sent by a core network device and that corresponds to the PDN connection in a second system comprises:

receiving, by the terminal device, a protocol configuration option (PCO) from the core network device, wherein the PCO carries the access type supported by the PDN connection in the second system.

3. The method according to claim 2, wherein the access type comprises 3rd Generation Partnership Project (3GPP) access and non-3GPP access.

4. The method according to claim 1, further comprising:
registering, by the terminal device, with the second system via the access network indicated by the access type.

5. The method according to claim 4, wherein
the terminal device registers with the second system via a 3GPP access network;
the terminal device registers with the second system via a non-3GPP access network; or
the terminal device registers with the second system via both a 3GPP access network and a non-3GPP access network.

6. A non-transitory computer-readable storage medium, comprising an instruction, wherein when the instruction is run on a PDU session establishment apparatus, the PDU session establishment apparatus is enabled to perform the method according to claim 1.

7. A PDU session establishment apparatus, comprising:
a receiver, configured to receive in a process of establishing a PDN connection in a first system, an access type that is sent by a core network device and that corresponds to the PDN connection in a second system; and
a processor, configured to: when a terminal device moves to the second system, establish a PDU session in the second system via an access network indicated by the access type, wherein the PDU session is associated with the PDN connection; determine to use a terminal device route selection policy (URSP) rule corresponding to an application of the PDU session; and when a parameter of the PDU session does not match the URSP rule of the application, skip binding the application to the PDU session or release the PDU session.

8. The apparatus according to claim 7, wherein that a processor is configured to receive, in a process of establishing a PDN connection in a first system, an access type that is sent by a core network device and that corresponds to the PDN connection in a second system comprises:

receiving a protocol configuration option (PCO) sent by the core network device, wherein the PCO carries the access type supported by the PDN connection in the second system.

9. The apparatus according to claim 8, wherein the access type comprises 3GPP access and non-3GPP access.

10. The apparatus according to claim 7, wherein the processor is further configured to:
register with the second system via the access network indicated by the access type.

11. The apparatus according to claim 10, wherein that the processor is configured to register with the second system via the access network indicated by the access type comprises:

registering with the second system via a 3GPP access network;
registering with the second system via a non-3GPP access network; or
registering with the second system via both a 3GPP access network and a non-3GPP access network.

* * * * *

UNITED STATES PATENT AND TRADEMARK OFFICE
CERTIFICATE OF CORRECTION

PATENT NO. : 11,310,843 B2
APPLICATION NO. : 16/977307
DATED : April 19, 2022
INVENTOR(S) : Xiaojuan Li et al.

It is certified that error appears in the above-identified patent and that said Letters Patent is hereby corrected as shown below:

On the Title Page

In item (56), in Column 2, under "Other Publications", Lines 2-3, delete "26 Mar." and insert -- 26-Mar. --.

In the Specification

In Column 1, Line 3, below "AND APPARATUS" insert -- CROSS-REFERENCE TO RELATED APPLICATIONS --.

Signed and Sealed this
Second Day of August, 2022

Katherine Kelly Vidal
*Director of the United States Patent and Trademark Office*